United States Patent
Pimlott

(10) Patent No.: US 7,876,671 B2
(45) Date of Patent: Jan. 25, 2011

(54) ELECTRONICS APPARATUS, A MANAGEMENT DEVICE FOR AN ELECTRONICS APPARATUS AND A METHOD OF MANAGING AN ELECTRONICS APPARATUS

(75) Inventor: Roger M. Pimlott, Portsmouth (GB)

(73) Assignee: Xyratex Technology Limited, Havant (GB)

( * ) Notice: Subject to any disclaimer, the term of this patent is extended or adjusted under 35 U.S.C. 154(b) by 234 days.

(21) Appl. No.: 12/038,298

(22) Filed: Feb. 27, 2008

(65) Prior Publication Data

US 2008/0225701 A1    Sep. 18, 2008

Related U.S. Application Data

(60) Provisional application No. 60/894,559, filed on Mar. 13, 2007.

(51) Int. Cl.
*H04L 12/26* (2006.01)
(52) U.S. Cl. ...................................... 370/217
(58) Field of Classification Search .............. 370/217, 370/218, 219, 220, 225, 228
See application file for complete search history.

(56) References Cited

U.S. PATENT DOCUMENTS 4,330,885 A * 5/1982 Abbott et al. ............... 370/217
5,329,520 A * 7/1994 Richardson ................. 370/225

OTHER PUBLICATIONS

Microsoft Computer Dictionary, 5th Edition, 2002, Microsoft Press, single page with definitions for "manager."*

* cited by examiner

*Primary Examiner*—Melvin Marcelo
(74) *Attorney, Agent, or Firm*—Pillsbury Winthrop Shaw Pittman LLP

(57) ABSTRACT

An electronics apparatus comprises an electronic device having at least first and second ports in communication with respective first and second communication paths by each of which communications can be made with the electronic device. The electronics apparatus comprises a management device arranged to collect information concerning the performance of the first and second ports and to apply a decision threshold to said information to decide whether or not each port has failed. If said decision is that the first port has failed, the management device is arranged to disable communication over the first communication path and to adjust the decision threshold for the second port.

31 Claims, 4 Drawing Sheets

ELECTRONICS APPARATUS, A MANAGEMENT DEVICE FOR AN ELECTRONICS APPARATUS AND A METHOD OF MANAGING AN ELECTRONICS APPARATUS

This application claims the benefit of priority to U.S. application Ser. No. 60/894,559, filed Mar. 13, 2007, the content of which is hereby incorporated by reference.

The present invention relates to an electronics apparatus, a management device for an electronics apparatus and a method of managing an electronics apparatus.

There are many examples of electronics devices that have two ports, such as hard disk drives, other storage devices, and other components of electronics systems where the electronic device needs to communicate with other devices in the system. An electronics device having two ports may for example provide two different paths by which the device may communicate with one or more other device, allowing a level of redundancy to be implemented in case of failure of one of the paths.

For example, referring to FIG. 1, a prior art electronic apparatus provides a network of disk drives arranged in a data storage device enclosure 1. The enclosure 1 is modular, having disk drive module bays 2 at the front of the enclosure 1 for receiving disk drive modules 3 (i.e. disk drives mounted in carriers), and bays 4,6,8 at the rear of the enclosure for receiving various modules, such as power supply units (PSUs) 5, cooling modules 7 and various electronics modules 9. These electronics modules 9 typically include one or more controllers for the disk drives, providing input/output connections to the enclosure, "just a bunch of disks" (JBOD), "managed bunch of disks" (MBOD) or "switched bunch of disks" (SBOD) functionality and/or "redundant array of inexpensive disks" (RAID) functionality. The electronics modules 9 may also provide enclosure management services or other functionality, either in the form of a separate enclosure management module or integrated into a controller module or other part of the enclosure 1. The various modules 3,5,7,9 plug into a midplane (not shown) within the enclosure 1 via connectors. The modules 3,5,7,9 are removable from the enclosure 1 for maintenance and/or replacement. Often modules 5,9 at the rear of the enclosure 1 are provided in duplicate or more so that a certain measure of redundancy can be provided in case of failure of a module. Many other layouts and configurations of data storage enclosures 1 are possible and, indeed, available commercially.

The disk drives 3 often have dual ports which allow connection to be made to the disk drives 3 via two paths, primarily so that further redundancy can be provided. Specifically, the enclosure management module monitors the performance of the ports, by collecting for example information about the integrity of the signal or errors detected in the communications protocol. Generally, the enclosure management module keeps an error count of detected errors and decides that a port is defective, or at least is to be regarded as defective, when the error count reaches a predetermined level. When one of the ports is determined to be defective, the enclosure management module causes the defective port to be bypassed.

There are two ways in which this is typically implemented. The defective port can be bypassed and the operation of the other port left active. This is sometimes known as "ignoring the bypass". This scheme suffers from the problem that the two ports of the disk drive are not truly independent, being linked by underlying hardware in the disk drive. This link means that the failure of one port often leads to an increased likelihood of failure of the other port or suggests that the other port is defective and may fail. Thus, by leaving the second port active, this leads to an increased risk that that port will also fail whilst in use, causing disruption to communications.

Alternatively, the second port can be bypassed as well as the defective first port. This scheme is based upon the assumption that failure of one port on a device is an indication that the other port on that device is also likely to fail due to some underlying cause affecting both ports, and so it is better to disable the other port in a controlled manner before its failure interferes with traffic on the loop. This scheme is sometimes known as "mirroring the bypass".

This second scheme ignores the fact that there may be two separate controllers present, each communicating with a different respective port of the device. The defect detected in the first port may in fact be due to a defect on its associated controller, such as being caused by a damaged capacitor. In this case, the disk drive itself is not faulty, and where the enclosure has two controllers the second controller can communicate with the disk drive normally. Thus in this case, bypassing both ports is the wrong course of action and negates the purpose of having dual controllers communicating with the disk drives over dual paths.

According to a first aspect of the present invention, there is provided an electronics apparatus comprising: an electronic device having at least first and second ports in communication with respective first and second communication paths by each of which communications can be made with the electronic device; and, a management device arranged to collect information concerning the performance of the first and second ports and to apply a decision threshold to said information to decide whether or not each port has failed, wherein if said decision is that the first port has failed, the management device is arranged to disable communication over the first communication path and to adjust the decision threshold for the second port.

In this way a more intelligent decision can be made regarding whether or not to disable a second port of a device if the first port is deemed to be defective. If a first port is deemed to be defective, the threshold that is used to determine whether or not the second port is defective can be adjusted accordingly. The performance of the second port can then be considered against this adjusted threshold to decide whether or not to bypass the second port. The performance may be based upon data already collected or subsequently collected or both.

This means that the criteria for disabling the second port can be more intelligently tailored to the circumstances. This helps largely avoid or at least mitigate the drawbacks present in prior art schemes, where failure of a first port led to a predetermined, yes-or-no decision as to whether to shut down the second port based solely on the decision to shut down the first port. Such yes-or-no decisions often lead to increased likelihood of a device being effectively shut down when in fact that device is not at fault, or conversely, a device not being shut down when the device is at fault. The present arrangement allows a more flexible decision to be made concerning shutting down of the other port or ports of a device, and thus helps maintain the proper overall functioning of the apparatus. This is done by allowing the decision threshold for the second port to be adjusted instead of simply deciding to shut off or not the second port. Thus any decision to shut off the second port takes into account two items of information, the decision that the first port is deemed to be defective and, in addition, information concerning the performance of the second port. The present arrangement may be tailored to the apparatus in which it is present by setting the thresholds and/or level and type of adjustment.

In this way, the availability of the devices in the enclosure can be maximised, leading to less downtime of the apparatus and the most efficient use of the apparatus resources.

In a preferred embodiment, the electronics device is a hard disk drive unit. The present arrangement is particularly advantageous when applied to one or more disk drives in an apparatus such as a storage enclosure of disk drives arranged as an MBOD, SBOD, RAID array, etc. The electronics device may alternatively be a solid state storage device, such as a flash drive. Nevertheless, the electronics device can be in general any electronics device having more than one port by which communications can be made with the device.

In an embodiment, at least one of the first and second communication paths is a Fibre Channel loop. Alternatively, at least one of the first and second communication paths may be one of serial attached SCSI (SAS) or serial ATA (SATA) protocols. Other suitable communication protocols may also be used.

In an embodiment, the apparatus comprises a port bypass circuit for at least the first port, wherein the management device disables communication over the first communication path by causing said port bypass circuit to bypass the first port. This arrangement is particularly suited to disk drive storage enclosures arranged as an MBOD.

In an embodiment, at least the first communication path comprises a Fibre Channel loop and a Fibre Channel switch, wherein the management device disables communication over the first communication path by causing the switch not to switch to the first port. This arrangement is particularly suited to disk drive storage enclosures arranged as an SBOD.

The information collected about the performance of the ports may include any of: the word error rate, the CRC error rate, number of LIP events, the clock delta between a transmitter and receiver of the port, the signal level at the port, port test data, "comma loss of sync", and "receiver loss of signal". Other suitable information may also be used, depending on the communication protocol used on the communication path to communicate with the electronics device.

The management device may be provided by at least one enclosure management module. The module may be removable from the apparatus, such as for example from a storage enclosure.

A separate enclosure management module may be provided for each of said communication paths and the enclosure management modules are arranged to exchange information concerning the performance of the ports on their respective communication paths. This allows two separate enclosure management modules to be provided.

In a preferred embodiment, the management device is arranged to group said collected information into at least two groups according to the type of the information and to apply a separate decision threshold against each group, wherein if it is decided that the port has failed on the basis of the information of only one of said groups, the decision threshold for only that group is reduced for the second port. The two groups can each consist of one or more types of information. This provides a particularly intelligent implementation where for example there is a strong statistical correlation or causal link between the failure mode, i.e. the way that that failure manifests itself in the performance information, and whether the failure affects both ports or just one. For example, a particular failure mode may be known to affect both ports, but to affect only a group of one or some of the types of collected information and not other types. Thus when the decision threshold is exceeded for the group for the first port, the decision threshold for this group for the second port can be suitably adjusted and the decision threshold for the other group for the second port can be left unchanged. In this way, where the first port of the electronics device has failed, a better decision can be made as to whether to disable the second port and thus effectively whether to disable the electronics device itself. This leads to increased availability of the electronic apparatus without compromising integrity.

The groups may include at least burst-word-error related information and signal-integrity related information.

In an embodiment, the decision threshold for the second port is reduced by at least 80% when adjusting its level. In another embodiment, the decision threshold for the second port is reduced by at least 50% when adjusting its level.

According to a second aspect of the present invention, there is provided a management device for managing an electronics apparatus having an electronic device having at least first and second ports in communication with respective first and second communication paths by each of communications can be made with the electronic device, the management device being arranged to collect information concerning the performance of the first and second ports of a said electronics device and to apply a decision threshold to said information to decide whether or not each port has failed, wherein if said decision is that the first port has failed, the management device is arranged to issue a signal that can be used to disable communication over the first communication path and is further arranged to adjust the decision threshold for the second port.

According to a third aspect of the present invention, there is provided a method of managing an electronics apparatus, the apparatus having an electronic device having at least first and second ports in communication with respective first and second communication paths by each of which communications can be made with the electronic device, the method comprising: collecting information concerning the performance of the first and second ports; applying a decision threshold to said information to decide whether or not each port has failed; and, if said decision is that the first port has failed, disabling communication over the first communication path and adjusting the decision threshold for the second port.

In preferred embodiments, the present invention relates to networks of multi-ported devices and controllers for those devices, and how to deal with failures of ports on those devices or on the controllers. In preferred embodiments, the present invention relates to storage enclosures for a plurality of disk drives arranged as JBODs, MBODs, SBODs, RAID arrays, "storage array network" (SAN) or "network attached storage" (NAS) storage, server enclosures and the like. The disk drives may be within a single storage enclosure or may be arranged over a distributed network or a mixture.

Embodiments of the present invention will now be described by way of example with reference to the accompanying drawings, in which.

Figure 1A:
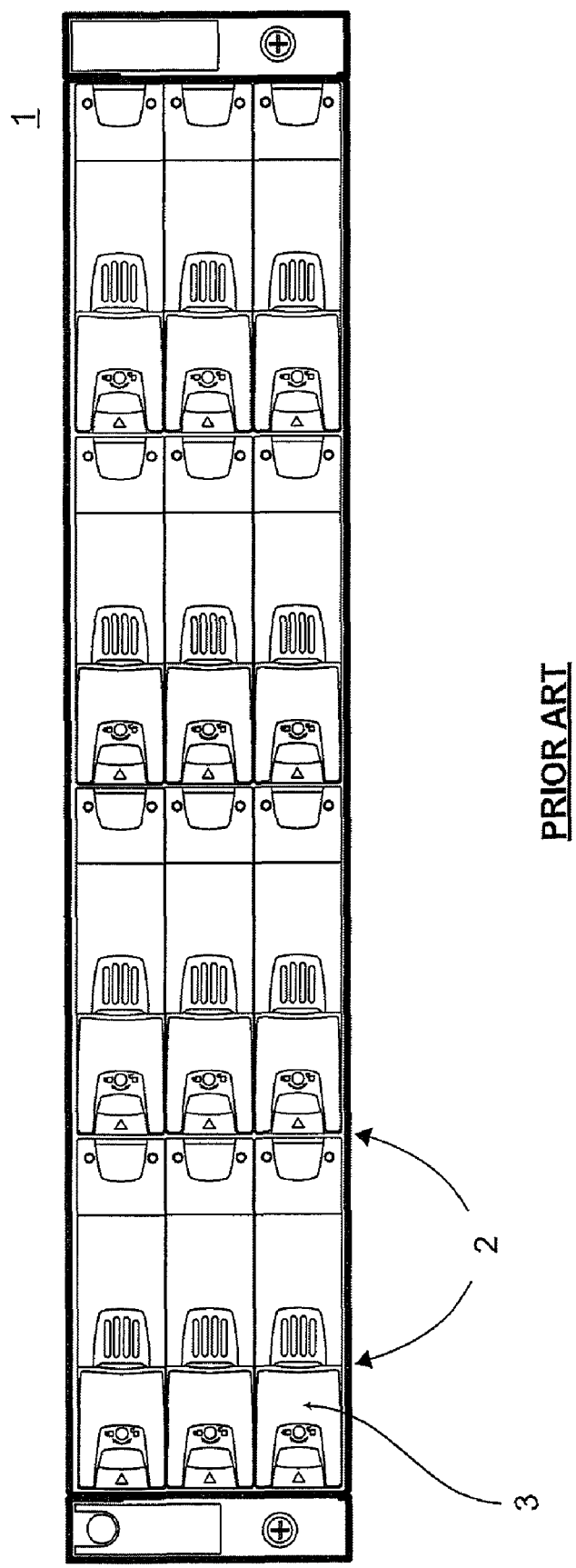
FIGS. 1a and 1b show a known storage enclosure from the front and rear respectively.
Figure 1B:
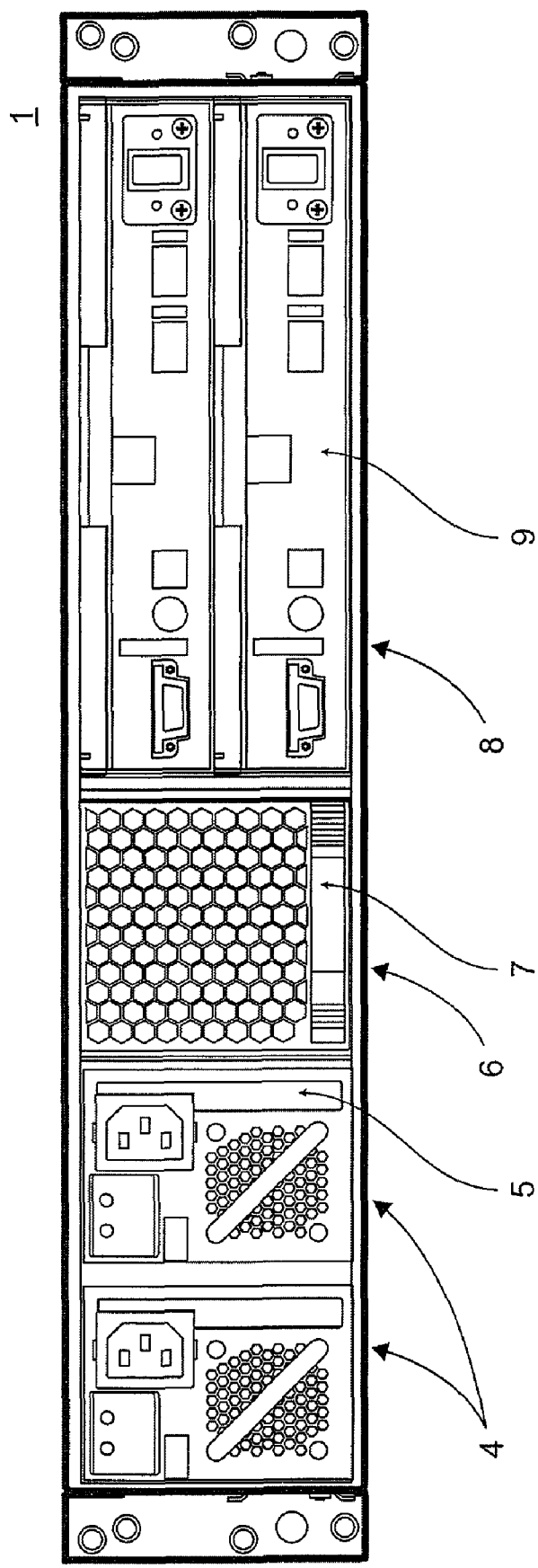
Figure 2:
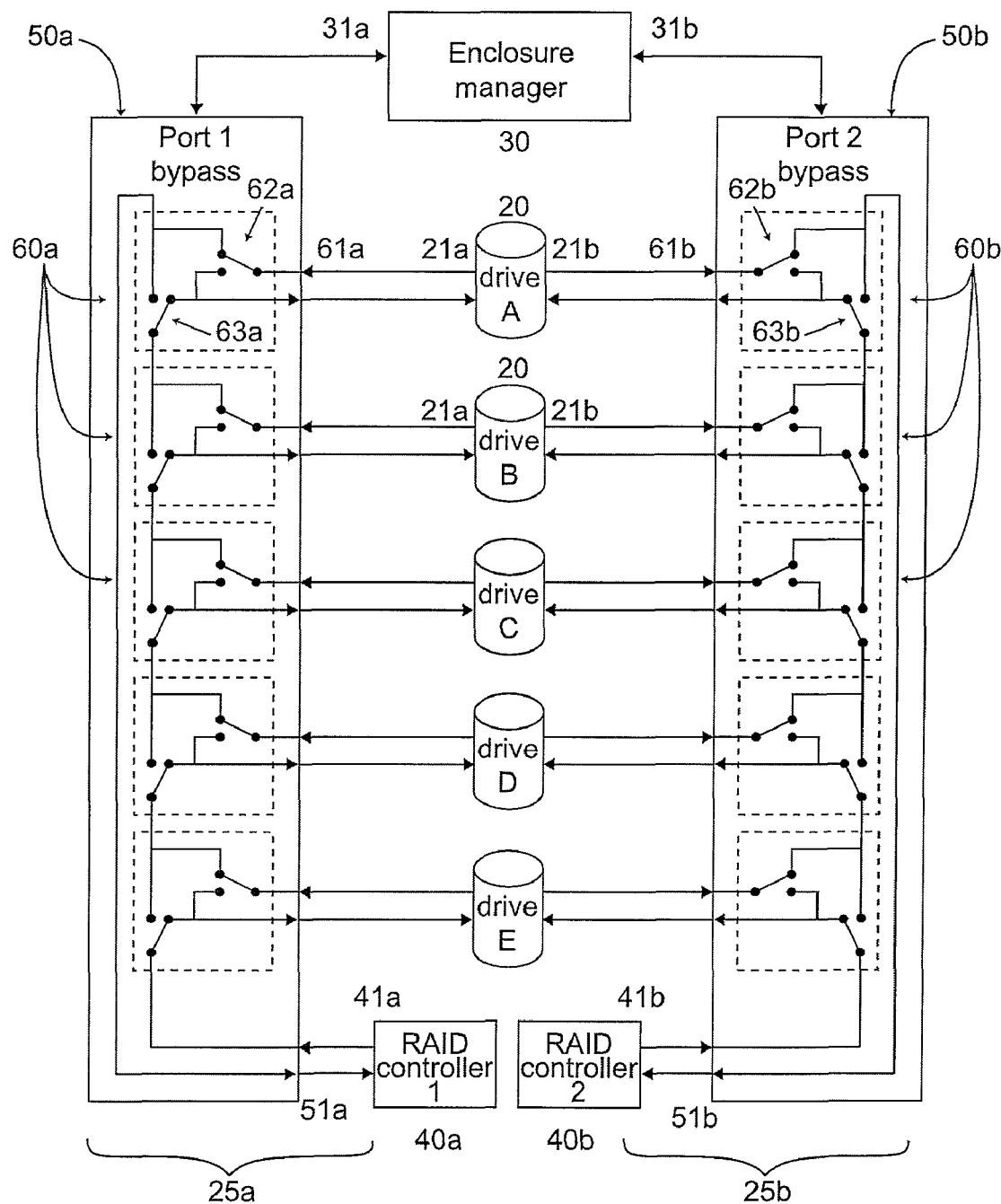
FIG. 2 shows schematically an example of a network of disk drives in accordance with an embodiment of the present invention; and, FIG. 3 shows schematically another example of a network of disk drives in accordance with an embodiment of the present invention.

FIG. 2 shows an example of a network 10 of disk drives 20, known as a "managed bunch (or box) of disks" (MBOD). The network 10 comprises a plurality of "Fibre Channel" (FC) disk drives 20. In order to enhance the availability of the apparatus each disk drive 20 has two FC input/output (I/O) ports 21a,21b, a first port 21a and second port 21b, by which communications can be made with the disk drive 20. This is generally to make it possible to communicate with the disk drive 20 even if one port 21a,21b fails.

Two "redundant array of inexpensive disks" (RAID) controllers 40a,40b are provided, a first controller 40a and a second controller 40b. The RAID controller may be provided as a standalone RAID head, or as RAID modules within the enclosure. Each RAID controller 40a,40b has a port 41a,41b for communicating with the disk drives 20. The port 41a of the first RAID controller 40a is arranged to communicate with the first ports 21a of the disk drives 20 and the port 41b of the second RAID controller 40b is arranged to communicate with the second ports 21b of the disk drives 20. Failure of a disk drive 20 is handled by the RAID controllers 40a,40b by implementing one of the well-known RAID architectures, and so will not be described in detail herein.

The disk drives 20 and RAID controllers 40a,40b in this example communicate by two Fibre Channel arbitrated loops (FC-AL): loop A which connects the first RAID controller 40a to the first port 21a of each of the disk drives 20a; and, loop B which connects the second RAID controller 40b to the second port 21b of each of the disk drives 20b. In accordance with the loop topography of the FC-AL standard, communications between a disk drive 20 and a RAID controller 40a, 40b must normally pass through all other drives 20. For example, communications between the first RAID controller 40a and disk drive B 20 must pass through disk drive A 20, and communications between disk drive B 20 and the first RAID controller 40a must pass through disk drives C, D and E 20. A potential drawback of this arrangement is that if one disk drive 20 or one of its ports 21a,21b fails, or if a disk drive 20 is deliberately removed from the loop 25a,25b, then communication between all disk drives 20 in that loop 25a,25b would be disrupted.

To prevent this, a port bypass circuit 50a,50b is provided for each loop 25a,25b to allow a failed port 21a,21b to be bypassed so as to allow communication around the loop 25a, 25b to continue. The port bypass circuits 50a,50b generally provide centralised port bypass switching connecting the disk drives 20 in a hub arrangement such that they still formed a logical loop but also such that an individual disk drive can be switched out of the loop using the port bypass switches. Each port bypass circuit 50a,50b operates identically on its respective loop 25a,25b, and so for clarity it will only be described in relation to the first loop 25a.

The port bypass circuit 50a has a port 51a by which it connects to the port 41a of its respective RAID controller 40a and five ports 61a by which it connects to the ports 21a of the disk drives 20. The circuit forms a loop 25a,25b connecting the RAID controller 40a,40b attached to port 51a,51b and the disk drives 20 attached to ports 61a,61b. Each port 61a has a pair of switches 62a,63a associated with it. With the switches 62a,63a in their normal positions, the disk drive is included in the loop. With the switches in their bypass position, a disk drive port 21a,21b is bypassed. For each port 61a, one switch 63a effectively closes the loop around the port 61a. The other switch 62a short-circuits the port 61a. For example, disk drive B 20 on loop B 25b is bypassed in this way. Where the port by-pass circuits are collected together in a central location as in FIG. 2, the apparatus is commonly known as a "Managed Bunch Of Disks" (MBOD).

This arrangement allows an individual port 21a of a drive 20 to be bypassed if that port 21a ceases to function correctly, thereby allowing all other drives 20 on that loop to continue to communicate with the RAID controller 40.

Where a port 21a is bypassed, the operation of switch 62a short circuits the port 21a so as to effectively connect the port 21a of the drive 20 to itself. This is done to preserve the integrity of the FC-AL environment of the port 21a, and to allow tests to be performed on such a bypassed disk drive 20 and its FC-AL circuitry in order to decide whether it can be re-connected to the main loop.

The bypass circuits 50a,50b are controlled by a management device 30. The management device may be provided by a separate enclosure management module 30. Alternatively, the management device 30 and the port bypass circuits 50a, 50b may be provided on the same circuit board, or elsewhere in the enclosure 10. The enclosure management module 30 is connected to the bypass circuits 50a,50b via links 31a,31b. Via these links 31a,31b, the enclosure management module 30 monitors the state of the FC loops 25a,25b and the drive ports 21a,21b connected to them. The enclosure management module 30 may also monitor the state of other devices in the network 10, such as for example power supplies (not shown), with the aim of maximising the availability of the network 10.

As is standard for FC disk drives 20, each drive port 21a, 21b comprises an optical transmitter and receiver for transmitting and receiving serial data over the FC paths to which it is connected. Each drive port 21a,21b has a "Serialiser/Deserialiser" (SERDES) circuit arranged to serialise data prior to being transmitted and to deserialise data that is received. The drive port 21a,21b also has a clock, which is synchronised with the incoming data in order that the timing of the signals can be maintained within acceptable limits throughout the FC loop 25a,25b. The disk drive also generally has a disk drive controller that provides circuitry to decode the incoming data and to arrange the data in words and packets and to check for data corruption. These functions are often provided by a CPU. The various components of the ports 21a,21b have failure modes that often determine whether one port or both ports will be affected by the failure. For example, a problem with the CPU in the drive controller will often cause problems with both ports. Similarly, a problem with the clock will often affect both ports. In contrast, a problem with the SERDES circuit of one of the ports will typically only affect the performance of that particular port and not the other.

The enclosure management module 30 monitors traffic on the loops that it is monitoring and extracts information about the performance of the circuitry it is monitoring, such as error statistics. The enclosure management module maintains an error count of the number of errors of the various types that occur within a certain time period for each port 21a,21b for each disk drive 20. Any one or more of the following items may be watched on a per port basis:

word errors (burst and longer term),
CRC errors,
LIP events,
clock delta between receiver and transmitter,
signal level,
ability of port to behave correctly on a loop prior to being inserted into main loop (for example, "Smart Insertion"— send and return LIP f7's, and "Port Test Before Insert"— capable of loop initialisation),
the standard checks that are needed to keep the signal locked (Receiver Loss of Signal and Comma Loss of Sync).

The enclosure management module 30 also stores a predetermined threshold for each type of error for each port 21a, 21b of each drive 20. If the number of errors of the error count exceeds the threshold appropriate to the type of error for a port 21a,21b, the decision is made to bypass the failing port 21a,21b on that drive 20.

Any or all of the above mentioned items, or other items appropriate to the application, can be used. Items can be grouped, having a single error count for multiple items and a single threshold for that group.

The reason for the bypass of a first drive port 21a,21b and other relevant information (e.g. word errors, rate of Loop Initialisation (LIP) disruption, insert count) is used to adjust the thresholds used on the second port 21a,21b of that drive 20 to control when it should be bypassed.

Two schemes are presently contemplated by which the threshold adjustments can be done. Under a first scheme, when a drive port 21a is bypassed, the other drive port 21b of that disk drive 20 is placed on a watch list and all thresholds for the other drive port 21b are reduced. The threshold may be reduced by any amount desired. For a typical implementation, the thresholds may be halved. In addition, attempts to recover a port 21a,21b would be reduced as they are only likely to cause disruption to the main loop. This approach assumes that one type of failure is an indication that any type of failure is more likely to occur.

Under a second scheme of threshold adjustment, a more sophisticated approach is to group the failure types into associated groups and to maintain an error count and threshold for each group for each port. Then, when the error count for a particular group exceeds the respective threshold for that group, the action taken can be one determined to be appropriate for that particular group. Depending on the group for which the error count has exceeded the threshold, the action taken can be any of: adjusting the threshold for that same group for the other port with the threshold for the other group or groups for the other port not being adjusted, or to adjust the threshold for all groups for the other port, or to turn off recovery for the port. An example would be if a burst word error problem causes a port 21a,21b to be bypassed, then the thresholds for the background word error and CRC error rates would be reduced. As for the first scheme, the threshold can be reduced by any amount convenient. For cases where the signal has been deemed unreliable (Comma Loss of Sync, Receiver Loss of Signal), then it would be appropriate to stop retrying to reinsert the drive.

This ability to adjust the thresholds is preferably controllable on a per device 20 basis, as it is possible that the controllers will be attached to disk drives 20 that are not dual ported via a dongle. In this arrangement, the dongle connects to a single ported drive 20 (e.g. a SATA drive) and provides dual ports, so as to replicate to some extent the functionality of a dual ported disk drive 20. Alternatively, in some cases the controllers may be each attached to a different intermediate device (e.g. SATA drive concentrator).

As will be appreciated, the way in which the threshold is adjusted will depend also on the form of the information collected about the performance of the circuitry being monitored. For example, as in the examples described above, where the information collected is some form of error count, it is appropriate to adjust the threshold by reducing its level. However, conversely for example, where the information collected is related to the mean time between the occurrences of errors, it will instead be appropriate to increase the threshold.

Figure 3:
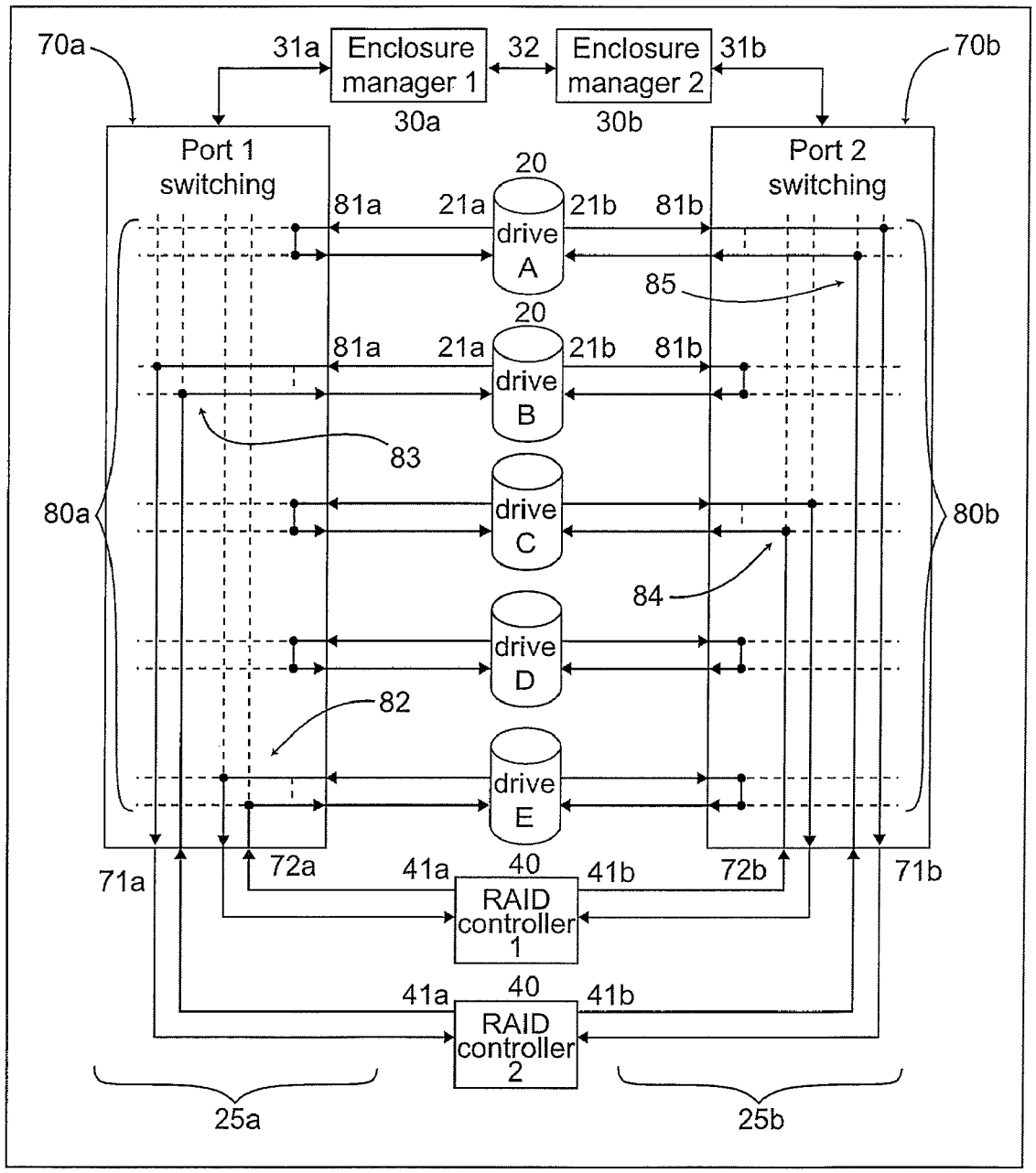

FIG. 3 shows another arrangement by which two RAID controllers 40 can communicate with multiple drives 20, known as a "Switched Bunch Of Disks" (SBOD). In this arrangement switching circuitry 70a,70b replaces the bypass circuitry 50a,50b of the MBOD configuration of FIG. 2. In this example, for additional redundancy, each RAID controller 40 has two ports 41a,41b and is capable of communicating with each port 21a,21b of each drive 20a,20b. Each switching circuit 70a,70b has two ports 71a,72a;71b,72b for connecting to respective RAID controllers 40a,40b. Each switching circuit 70a,70b has ports 81a,81b for connecting to the disk drives 20 via their ports 21a,21b. The switching fabric 80a, 80b of the switching circuitry 70a,70b allows any free RAID controller 40 to be connected to any free drive 20, effectively giving a point-to-point connection between the two. Two or more simultaneous connections are possible. The switching circuitry 70a,70b is invisible to the FC-AL protocol, but monitors some of the basic communication protocols in order to decide which connections should be made, and to ensure that all attached devices are serviced in a fair manner. FIG. 3 shows four active connections 82,83,84,85: between the first RAID controller 40 and drive E 20 on loop A 25a, the second RAID controller 40 and drive B 20 on loop A 25a, the first RAID controller 40 and drive C 20 on loop B 25b and the second RAID controller 40 and drive A 20 on loop B 25b. No connection is made to the remaining six drive ports 21a,21b. The bypassed port 21a,21b is connected to itself for similar reasons as given above for the MBOD configuration.

A similar scheme for adjusting the thresholds is applied as described above. For additional redundancy, in this example two enclosure management modules 30a,30b are provided. Each enclosure management module 30a,30b monitors the ports 21a,21b on its respective loop 25a,25b and collects information about its performance in a similar way as described above. The enclosure management modules 30a, 30b communicate with each other via a link 32, particularly to share status information and to allow joint decisions to be made about maintaining availability.

If a port 21a,21b on a device in an SBOD configuration fails there is no need to actively bypass it. Instead, by commanding the switch to never connect to it, it cannot interfere with communication with other disk drives 20. Nevertheless, in the present context, such a port will still be described as "bypassed". Similarly, the SBOD configuration does not have "loops" such as the loops 25a,25b of the MBOD configuration, since point-to-point connections are formed between the RAID controllers 40a,40b and the disk drives 20. A loop 25a,25b should be interpreted in the context of the SBOD configuration as connections made to/from the respective first ports 21a,21b of the disk drives 20.

Embodiments of the present invention have been described with particular reference to the examples illustrated. However, it will be appreciated that variations and modifications may be made to the examples described within the scope of the present invention.

The invention claimed is:

1. An electronics apparatus comprising:
an electronic device having at least first and second ports in communication with respective first and second communication paths by each of which communications can be made with the electronic device;
a first port bypass circuit or switch arranged to selectively disable communications with the first port over the first communication path and a second port bypass circuit or switch arranged to selectively disable communications with the second port over the second communication path; and,
a management device comprising one or more electronic circuits in communication via links with the first and second port bypass circuits or switches, the one or more circuits of the management device being constructed and arranged to collect information over the links concerning the performance of the first and second ports and to apply a decision threshold to said information to decide whether or not each port has failed,
wherein if said decision is that the first port has failed, the management device is arranged to generate a signal over the link with the first port bypass circuit or switch to disable communication over the first communication path and to adjust the decision threshold for the second port.

2. An apparatus according to claim 1, wherein the electronic device is a disk drive.

3. An apparatus according to claim 1, wherein at least one of the first and second communication paths is a Fibre Channel loop.

4. An apparatus according to claim 1, wherein at least the first path is a Fibre Channel path and said first port bypass circuit or switch is a Fibre Channel switch.

5. An apparatus according to claim 1, wherein the management device is arranged to collect information about the performance of the ports that includes any one or more of: the word error rate, the CRC error rate, number of LIP events, the clock delta between a transmitter and receiver of the port, the signal level at the port, port test data, "comma loss of sync", and "receiver loss of signal".

6. An apparatus according to claim 1, wherein the management device is provided by at least one enclosure management module.

7. An apparatus according to claim 6, wherein a separate enclosure management module is provided for each of said communication paths and the enclosure management modules are arranged to exchange information concerning the performance of the ports on their respective communication paths.

8. An apparatus according to claim 1, wherein the management device is arranged to group said collected information into at least two groups according to the type of the information and to apply a separate decision threshold against each group, wherein if it is decided that the port has failed on the basis of the information of only one of said groups, the management device is arranged to reduce the decision threshold for only that group for the second port.

9. An apparatus according to claim 8, wherein the groups include at least burst-word-error related information and signal-integrity related information.

10. An apparatus according to claim 1, wherein the management device is arranged to adjust the decision threshold for the second port by reducing the level of the threshold by at least 80%.

11. An apparatus according to claim 1, wherein the management device is arranged to adjust the decision threshold for the second port by reducing the level of the threshold by at least 50%.

12. A management device for managing an electronics apparatus having an electronic device having at least first and second ports in communication with respective first and second communication paths by each of communications can be made with the electronic device, the management device comprising one or more electronic circuits for communication via links with a first port bypass circuit or switch arranged to selectively disable communications with the first port over the first communication path, and a second port bypass circuit or switch arranged to selectively disable communications with the second port over the second communication path, the one or more circuits of the management device being constructed and arranged to collect information concerning the performance of the first and second ports of said electronics electronic device and to apply a decision threshold to said information to decide whether or not each port has failed, wherein if said decision is that the first port has failed, the management device is arranged to issue a signal over the link with the first port bypass circuit or switch to disable communication over the first communication path and is further arranged to adjust the decision threshold for the second port.

13. A management device according to claim 12, wherein the management device is arranged to collect information about the performance of the ports that includes any of: the word error rate, the CRC error rate, number of LIP events, the clock delta between a transmitter and receiver of the port, the signal level at the port, port test data, "comma loss of sync", and "receiver loss of signal".

14. A management device according to claim 12, wherein the management device is provided by an enclosure management module of a disk drive storage enclosure.

15. A management device according to claim 14, wherein a separate enclosure management module is provided for each of said communication paths and the enclosure management modules are arranged to exchange information concerning the performance of the ports on their respective communication paths.

16. A management device according to claim 12, wherein the management device is arranged to group said collected information into at least two groups according to the type of the information and to apply a separate decision threshold against each group, wherein if it is decided that the port has failed on the basis of the information of only one of said groups, the management device is arranged to reduce the decision threshold for only that group for the second port.

17. A management device according to claim 16, wherein the groups include at least burst-word-error related information and signal-integrity related information.

18. A management device according to claim 12, wherein the management device is arranged to adjust the decision threshold for the second port by reducing the level by at least 80%.

19. A management device according to claim 12, wherein the management device is arranged to adjust the decision threshold for the second port by reducing the level by at least 50%.

20. A method of managing an electronics apparatus, the apparatus having an electronic device having at least first and second ports in communication with respective first and second communication paths by each of which communications can be made with the electronic device, the method comprising:

collecting information concerning the performance of the first and second ports;

applying a decision threshold to said information to decide whether or not each port has failed; and, if said decision is that the first port has failed, disabling communication over the first communication path and adjusting the decision threshold for the second port.

21. A method according to claim 20, wherein the electronic device is a disk drive.

22. A method according to claim 20, wherein at least one of the first and second communication paths is a Fibre Channel loop.

23. A method according to claim 20, wherein the apparatus comprises a port bypass circuit for at least the first port, and said step of disabling communication over the first communication path comprises causing said port bypass circuit to bypass the first port.

24. A method according to claim 20, wherein at least the first communication path is a Fibre Channel path and comprises a Fibre Channel switch in said first communication path, wherein the management device disables communica tion over the first communication path by causing the switch not to switch to the first port.

25. A method according to claim 20, comprising collecting said information about the performance of the ports to include any one or more of: the word error rate, the CRC error rate, number of LIP events, the clock delta between a transmitter and receiver of the port, the signal level at the port, port test data, "comma loss of sync", and "receiver loss of signal".

26. A method according to claim 20, wherein collecting information, applying a decision threshold, disabling communication and adjusting the decision threshold are performed by a management device, the management device being provided by at least one enclosure management module.

27. A method according to claim 26, wherein a separate enclosure management module is provided for each of said communication paths, the method comprising exchanging information concerning the performance of the ports on their respective communication paths between the enclosure management modules.

28. A method according to claim 20, comprising:
grouping said collected information into at least two groups according to the type of the information;
applying a separate decision threshold against each group; and,
if it is decided that the port has failed on the basis of the information of only one of said groups, reducing the decision threshold for only that group for the second port.

29. A method according to claim 28, comprising grouping said collected information into groups that include at least burst-word-error related information and signal-integrity related information.

30. A method according to claim 20, comprising adjusting the decision threshold for the second port by reducing the level by at least 80%.

31. A method according to claim 20, comprising adjusting the decision threshold by reducing the level for the second port by at least 50%.

* * * * *